US011619723B2

(12) United States Patent
Xu et al.

(10) Patent No.: US 11,619,723 B2
(45) Date of Patent: Apr. 4, 2023

(54) MULTIPLE-MODE FREQUENCY SHARING FOR TIME-OF-FLIGHT CAMERA

(71) Applicant: Microsoft Technology Licensing, LLC, Redmond, WA (US)

(72) Inventors: Zhanping Xu, Sunnyvale, CA (US); Andrew Dean Payne, Mountain View, CA (US); John Peter Godbaz, Sunnyvale, CA (US); Travis J. Perry, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 16/578,776

(22) Filed: Sep. 23, 2019

(65) Prior Publication Data

US 2021/0088636 A1  Mar. 25, 2021

(51) Int. Cl.
*G01S 7/4915* (2020.01)
*G01S 7/4911* (2020.01)
(Continued)

(52) U.S. Cl.
CPC ........... *G01S 7/4915* (2013.01); *G01S 7/4911* (2013.01); *G01S 17/42* (2013.01); *G01S 17/89* (2013.01); *H04N 5/2256* (2013.01)

(58) Field of Classification Search
CPC ........ G01S 7/4915; G01S 17/89; G01S 17/42; G01S 7/4911; G01S 17/36; G01S 17/894; H04N 5/2256
(Continued)

(56) References Cited

U.S. PATENT DOCUMENTS 7,433,029 B1 * 10/2008 Hsu ................... G01B 11/26
356/141.5
8,587,771 B2   11/2013 Xu et al.
(Continued)

FOREIGN PATENT DOCUMENTS

WO   2015024871 A1   2/2015
WO   2016171913 A1   10/2016
WO   2018136709 A1   7/2018

OTHER PUBLICATIONS

"International Search Report and Written Opinion Issued in PCT Application No. PCT/US20/037976", dated Sep. 28, 2020, 11 Pages.
(Continued)

*Primary Examiner* — Christopher S Kelley
*Assistant Examiner* — Ana Picon-Feliciano
(74) *Attorney, Agent, or Firm* — Alleman Hall Creasman & Tuttle LLP

(57) ABSTRACT

Examples are disclosed herein that relate to a time-of-flight camera that performs phase unwrapping in an efficient manner. In one example, a time-of-flight camera includes a light emitter, a sensor array, and a controller. The controller is configured to select a frequency mode from a plurality of frequency modes, each frequency mode including two or more different frequencies, and at least two different frequency modes of the plurality of frequency modes having a common frequency shared between the at least two frequency modes, control the light emitter to illuminate a scene with modulated light of the two or more different frequencies of the frequency mode selected, control the sensor array to receive the modulated light reflected from objects within the scene, and process the modulated light received to determine unwrapped phases for the frequency mode
(Continued)

selected based on the two or more different frequencies of the frequency mode selected.

20 Claims, 8 Drawing Sheets

(51) Int. Cl.
    *G01S 17/42* (2006.01)
    *G01S 17/89* (2020.01)
    *H04N 5/225* (2006.01)

(58) Field of Classification Search
    USPC .......................................................... 348/135
    See application file for complete search history.

(56) References Cited

U.S. PATENT DOCUMENTS

| | | | |
|---|---|---|---|
| 9,702,976 B2 | 7/2017 | Xu et al. | |
| 9,753,128 B2* | 9/2017 | Schweizer | G01S 17/36 |
| 10,091,491 B2* | 10/2018 | Choi | G01S 17/894 |
| 10,557,921 B2* | 2/2020 | Bleyer | G01S 7/4808 |
| 2011/0188028 A1* | 8/2011 | Hui | G01S 17/36 |
| | | | 356/5.01 |
| 2012/0013887 A1* | 1/2012 | Xu | G01S 17/894 |
| | | | 356/4.02 |
| 2014/0049767 A1* | 2/2014 | Benedetti | G01S 17/894 |
| | | | 356/5.1 |
| 2016/0047913 A1* | 2/2016 | Lamesch | G01S 17/36 |
| | | | 702/159 |
| 2016/0116594 A1* | 4/2016 | Xu | G01S 17/36 |
| | | | 356/5.1 |
| 2016/0314613 A1* | 10/2016 | Nowozin | G06T 15/005 |
| 2017/0205497 A1* | 7/2017 | Dorrington | G01S 7/497 |
| 2018/0011195 A1* | 1/2018 | Perry | G01S 17/89 |
| 2020/0301014 A1* | 9/2020 | Schoenlieb | G01S 17/32 |
| 2020/0349728 A1* | 11/2020 | Bitan | G06T 7/521 |

OTHER PUBLICATIONS

Xu, Zhanping, "Investigation of 3D-Imaging Systems Based on Modulated Light and Optical RF-Interferometry (ORFI)", Published in Shaker Verlag, ISBN: 978-3-8265-6736-0, Dec. 1999, 211 Pages.

* cited by examiner

MULTIPLE-MODE FREQUENCY SHARING FOR TIME-OF-FLIGHT CAMERA

BACKGROUND

A time-of-flight (ToF) camera may be used to produce a depth image of an environment, with each pixel of the depth image representing a distance to a corresponding point in the environment. The distance to a point on an imaged surface in the environment is determined based on the length of the time interval in which light emitted by the camera travels out to that point and then returns back to a sensor array of the camera (i.e., the ToF). The ToF camera measures this interval for many points on the surface and thereby assembles a depth image in which a depth coordinate for each pixel in the depth image is proportional to the ToF observed at that pixel.

SUMMARY

Examples are disclosed herein that relate to performing phase unwrapping for multiple frequency modes of a ToF camera in an efficient manner. In one example, a ToF camera includes a light emitter, a sensor array, and a controller. The controller is configured to select a frequency mode from a plurality of frequency modes, each frequency mode including two or more different frequencies, and at least two different frequency modes of the plurality of frequency modes having a common frequency shared between the at least two frequency modes. The controller is further configured to control the light emitter to illuminate a scene with periodic modulated light of the two or more different frequencies of the frequency mode selected, control the sensor array to receive the periodic modulated light reflected from objects within the scene, and process the periodic modulated light received by the sensor array to determine unwrapped phases for the frequency mode selected based on the two or more different frequencies of the frequency mode selected.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Optical ToF imaging has become the predominant depth-imaging technology, owing at least partly to the development of high-speed, high-resolution optical sensor arrays. 'Phase-based' optical ToF imaging is a variant of this technique in which depth is computed based on the phase lag of periodic modulated light reflected back from the subject. Devices employing this technique are increasingly found in both industrial and consumer applications, including device automation applications, gaming and virtual reality applications, biometric and facial recognition applications, etc.

Figure 1:
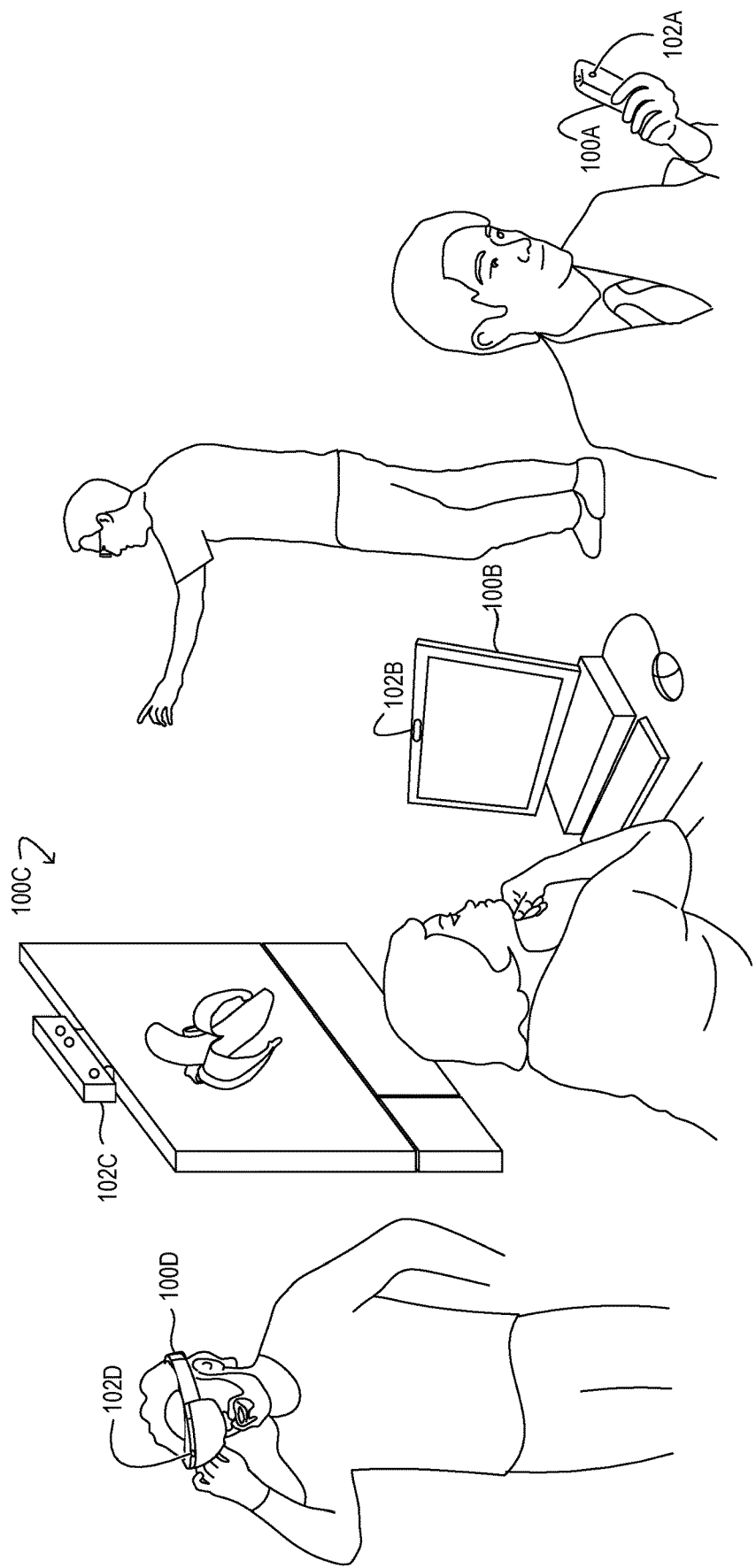
FIG. 1 shows example electronic devices having embedded or peripheral ToF cameras.

FIG. 1 shows aspects of four different examples of electronic devices (100A-D) having embedded or peripheral ToF cameras (102A-D). Device 100A is a smartphone that includes a ToF camera 102A. Device 100B is a personal computer that includes a web ToF camera 102B. Device 100C is a video game system that includes a peripheral 3D ToF camera 102C. Device 100D is a virtual-reality or augmented-reality headset that includes a 3D ToF camera 102D. The example phase unwrapping approaches disclosed herein may be applicable to these and other ToF cameras.

Figure 2:
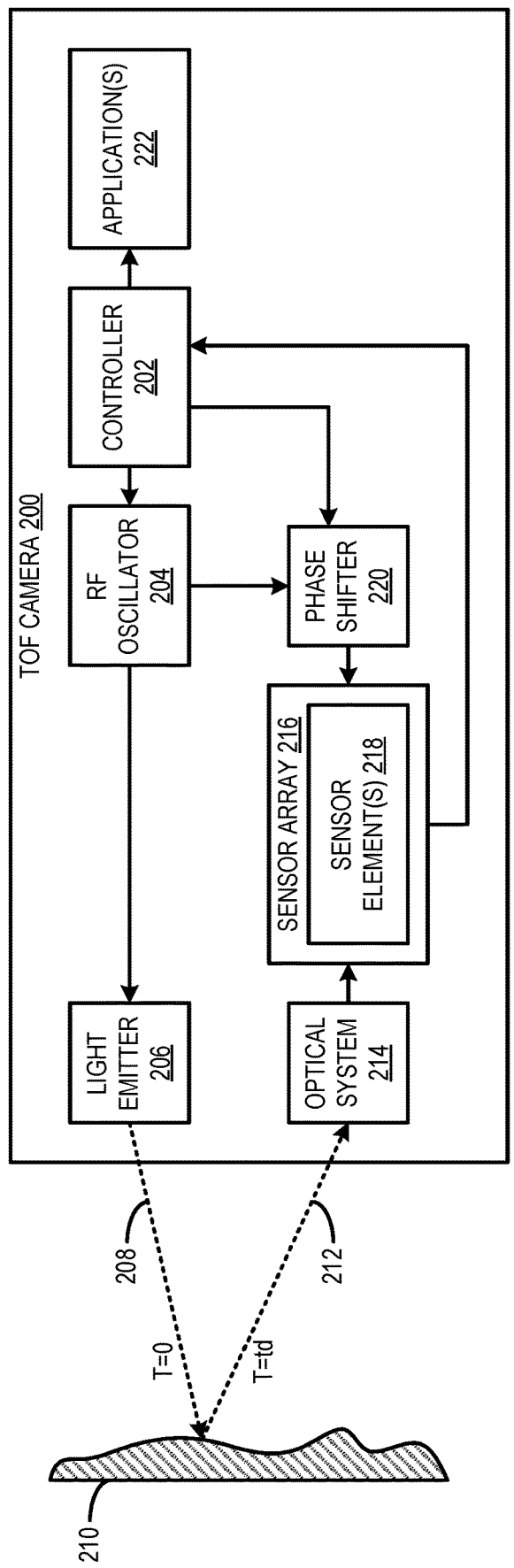
FIG. 2 shows an example ToF camera.

FIG. 2 shows an example ToF camera 200. The ToF camera 200 may be configured to operate in different modes of operation in which different sets of frequencies of amplitude/periodic modulated light are emitted by the ToF camera to determine depths of different objects in a scene. These different modes of operation are referred to herein as frequency modes. The different frequency modes each may be configured to provide depth measurements for different operating conditions of the camera and/or the scene. For example, different frequency modes may be configured for different distances, reflectivities, and/or power profiles for the ToF camera 200. To support the different modes of operation, the ToF camera 200 includes a radio frequency (RF) oscillator 204 configured to generate RF-modulated signals at frequencies having a ratio relationship that is any suitable integer and/or fractional number, generically denoted by $f_k$ with k=1, 2, 3, ... m, (such that $f_k$ can be any integer and/or fractional frequencies) where m is the maximum number of frequencies generated by the RF oscillator 204. A controller 202 may be configured to control the RF oscillator 204 to generate different sets of frequencies for different frequency modes. The controller 202 may be configured to control the RF oscillator 204 to generate any suitable combination of different RF-modulated signals for a given frequency mode. For a given frequency mode, the controller 204 may be configured to control the RF oscillator 204 to successively output different RF-modulated signals corresponding to the different frequencies of the set for the given frequency mode.

The RF oscillator 204 is configured to output RF-modulated signals to a light emitter 206. The light emitter 206 is configured to illuminate a scene with periodic modulated light 208 of the different frequencies of the selected frequency mode based on the RF-modulated signals received from the RF oscillator 204. In some implementations, the controller 202 may be configured to control the light emitter 206 to emit the periodic modulated light at different power levels for different frequencies of the selected frequency mode.

The light emitter 206 may take any suitable form. Non-limiting examples of the light emitter 206 include a light emitting diode (LED) and a laser diode (LD). In some implementations, a beam emitted from the light emitter 206 optionally may be expanded via an intermediate optical system to illuminate the scene for depth measurements.

In the illustrated example, the periodic modulated light 208 is emitted from the light emitter 206 at time T=0. The periodic modulated light 208 illuminates an object 210 in the scene. Backscattered light 212 is reflected from the object 210 back to an optical system 214 of the ToF camera 200. The optical system 214 is configured to direct the backscattered light 212 to a sensor array 216 including one or more sensor elements (e.g., pixels) 218 that are configured to image the backscattered light 212. The periodic modulated light 208/backscattered light 212 experiences a time-of-flight delay T=$t_d$.

The optical system 214 may include any suitable lens(es) or other optical element(s). The sensor array 216 may take any suitable form and may include any suitable number of sensor elements 218. For example, the sensor array 216 may include a high-resolution array of complementary metal-oxide semiconductor (CMOS) sensor elements (e.g., pixels), or a charge-coupled device (CCD).

When the RF-modulated signals are sent from the RF oscillator 204 to the light emitter 206, the RF-modulated signals are also dispatched from the RF oscillator 204 to a phase shifter 220. The phase shifter 220 is configured to shift the RF-modulated signals within $2\pi$ for each modulation frequency $f_k$. For example, the phase shift steps (>=3) may be set at equal distances within $2\pi$ for each modulation frequency $f_m$. Since the depth related phase wraps in terms of $2\pi$ increments, ambiguity of the actual measurement distance may be created in some instances. In particular, surface points of objects in the scene at depths that differ by any integer multiple of $c/(2f)$, where c is the velocity of light and f is the modulation frequency, are observed at the same phase lag $\varphi$. Depth-image data resolved only to that degree—e.g., data from a single-phase image is said to be 'aliased' or 'wrapped'. The controller 202 may be configured to resolve this ambiguity, as will be discussed in further detail below.

The phase shifter 220 is configured to send the phase shifted RF-modulated signals to the sensor array 216, which is configured to use the phase shifted RF-modulated signals to the demodulate the RF-modulated signals received by the sensor elements 218 of the sensor array 216. The controller 202 is configured to gather and process signal data from the various sensor elements 218 of the sensor array 216 to thereby construct a depth image of the object 210 in the scene.

Digital images constructed by the controller 202 may be represented as a numeric array with a value $S_j$ provided for each of a set of pixels $(X, Y)_j$. The X, Y position of each pixel of the digital image is mapped to an associated sensor element 218 of sensor array 216, and, via optical system 214, to a corresponding associated locus of the object 210. In some implementations, the mapping resolution of image pixels to sensor elements may be a 1:1 mapping, but other mappings may be used as well, such as 1:4, 4:1, among others. In some implementations, ToF camera 200 may be configured to acquire a time-resolved sequence of digital images of the object 210—i.e., video.

The dimensionality of the $S_j$ value of pixels $(X, Y)_j$ is not particularly limited. In some examples, $S_j$ may be a real- or integer-valued scalar that specifies the brightness of pixel $(X, Y)_j$. In other examples, $S_j$ may be a vector of real or integer values that specifies the color of pixel $(X, Y)_j$—e.g., using scalar component values for the red, green, and blue color channels. In still other examples, $S_j$ may be preprocessed to include a complex value $a+b\sqrt{-1}$, where a and b are integers or real numbers. A complex value $S_j$ may be used to represent the signal response of the sensor elements 218 for continuous-wave (CW) modulation and phase discrimination to resolve radial distance. In such cases, the camera may be referred to as a 'CW-ToF camera'.

In order to resolve depth in ranges larger than $c/(2f)$, it is possible to compute additional phase images using 'raw images' acquired at different modulation frequencies. In some examples three, four, five, or more frequencies may be used; in other examples two frequencies are sufficient. The combined input from all of the raw images (e.g., nine in the case of three frequencies, six in the case of two) is sufficient to determine a radial distance $Z_j$ between the depth camera and the surface point imaged at each sensor element j. Redundant depth-imaging of the same object and image frame to provide a non-periodic depth estimate is called 'de-aliasing' or 'unwrapping'.

The controller 202 may be configured to process the received modulated light 212 to determine unwrapped phases for a selected frequency mode of operation based on the different frequencies of the selected frequency mode. The controller 202 may be configured to determine unwrapped phases for a selected frequency mode according to any suitable approach. As one example, the controller 202 may be configured to perform phase unwrapping in the complex domain wherein vector phase unwrapping is converted into a scalar phase unwrapping process. Such an approach allows a ToF camera to use any optimized set of frequencies without being constrained by common integer denominators, thus allowing for adaptive systemic power efficiency. The computational power needed to perform unwrapping of scalars is less than phase vector-based methods for an equal or even higher number of frequencies used. Such an unwrapping approach may use the same generic formulation to handle any number of frequencies as well as any type of frequency combinations, and may allow for adaptive, user friendly ToF cameras that may self-optimize for a given imaging environment.

In one example, phase unwrapping in the complex domain may include processing the received infrared light to determine wrapped phase vectors for each frequency of modulation light. For example, for each frequency of modulation light received at the sensor array, the resultant capture signal can be expressed as:

$$V_{m,k} = CM_m \cdot AB_m \cdot \cos(\varphi_{d,m} + \psi_k) \text{ for } k=1,2,\ldots N_k \text{ and } m=1,2,\ldots N_m \quad (Eq. 1),$$

The variable m is a number of frequencies, and $V_{m,k}$ represents the sensor voltage output (e.g., capture signal) at a modulation frequency $f_m$ for m>=2. The capture intensity may be two dimensional and have an index (i,j) corresponding to location and distance. $CM_m$ is a common mode of the capture at modulation frequency $f_m$, representing a DC component of the signal. $AB_m$ is an active brightness at modulation frequency $f_m$, which is related to the phase signal and contributed by the active light emitted from the modulated light emitter and the reflectivity of the object. This allows for differences in received illumination power across frequencies to be accounted for in downstream equations. $\varphi_{d,m} = 2\pi f_m t_d$ and represents the time-of-flight corresponding phase at modulation frequency $f_m$. $\psi_k$ represents the equally distanced phase shift steps within $2\pi$ module for k>=3. The phase shift steps may be the same at each frequency condition. $N_k$ represents the total number of phase shifting steps at each frequency, with the assumption that they are the same at each frequency. $N_m$ represents the total number of frequencies output by the modulated light emitter.

Eq. 1 may be converted to a normal equation and its accompanying derivations:

$$E = \sum_{m,k} [V_{m,k} - CM_m - AB_m \cos(2\pi f_m t_d + \psi_k)]^2 \quad \text{(Eq. 2)}$$

$$\frac{\partial E}{\partial CM_m} = 0 \quad \text{(Eq. 2a)}$$

$$\frac{\partial E}{\partial t_d} = 0 \quad \text{(Eq. 2b)}$$

$$\frac{\partial E}{\partial AB_m} = 0. \quad \text{(Eq. 2c)}$$

The normal equation applies a least-squares method that effectively filters Gaussian noise from the phase vectors using a numeric filter in the complex domain. By including active brightness, amplitude modulation across the different frequencies may be accounted for. When amplitude is low, phase error tends to be large, containing more phase noise. Accounting for active brightness in the formulation in the complex domain allows for weighting of the different frequencies that may reduce unwrapping failures due to unbalanced phase standard deviations at frequencies due to the different MEs or integration times to reduce the error contributed to the entire system. Phase unwrapping thus becomes robust when phase error is unbalanced.

For example, the three system variables may be derived based on solving Equations 2a, 2b, and 2c for each specific frequency $f_m$:

$$CM_m = 1/N_k \sum_k (V_{m,k}); \quad \text{(Eq. 3a)}$$

$$\varphi_{d,m} = 2\pi f_m t_{dm} = \arctan\left(\frac{-I(m)}{R(m)}\right); \quad \text{Eq. 3b}$$

$$AB_m = 2/N_k \sqrt{I(m)^2 + R(m)^2}, \quad \text{Eq. 3c};$$

wherein $I(m) = \Sigma_k[V_{m,k} \sin(\psi^k)]$, and represents the imaginary part of a complex value; $R(m) = \Sigma_k[V_{m,k} \cos(\psi^k)]$, and represents the real part of a complex value; $\varphi_{d,m} = 2\pi f_m t_{dm}$, and represents the wrapped phase in a $2\pi$ module following the arctan operation expressed in Eq. 3b; and $t_{dm}$ represents a wrapped time-of-flight at each frequency $f_m$.

Further, the wrapped phase vectors may be converted to phase scalars in a complex domain in order to determine the unwrapped phase of each of the frequencies. For example, by further solving Eq. 3c with all frequencies of $f_m$ together, an unwrapping formulation may be generated that is constrained by the complex value $R(m)$ and $I(m)$, unitarily in the complex domain:

$$U_M = \quad \text{(Eq. 4)}$$
$$\sum_m \left[ R(m) \cdot \cos(2\pi f_m T_d) - I(m) \cdot \sin(2\pi f_m T_d) - \frac{N_k}{2} AB_m \right] = 0$$

wherein $T_d$ represents the unwrapped time-of-flight related to one single specific frequency $f_{m0}$, for example, the highest frequency. Choosing a different frequency as $f_{m0}$ may have different unwrapping robustness and computational speed.

Considering this value together with the wrapped time-of-flight $t_{dm0}$ given in Eq. 3b, yields the relationship:

$$2\pi f_{m0} T_d = 2\pi M + 2\pi f_{m0} t_{dm0} \text{ for } M=0,1,2 \ldots M_{max} \quad \text{(Eq. 4a)}.$$

Substituting the relationship of Eq. 4a into Eq. 4 yields:

$$U_M = \sum_m \left[ R(m) \cdot \cos\left(2\pi f_m\left(\frac{M}{f_{m0}} + t_{d,m0}\right)\right) - \quad \text{(Eq. 5)} \right.$$
$$\left. I(m) \cdot \sin\left(2\pi f_m\left(\frac{M}{f_{m0}} + t_{d,m0}\right)\right) - \frac{N_k}{2} AB_m \right] = 0$$

wherein M is the wrapped period number of $2\pi$ module at frequency $f_{m0}$. From the derivation condition of Eq. 2c it may be inferred that if the integer M makes function $U_M$ of Eq. 5 reach an extremum (e.g., a minimum value), then the M value is the repeating number $2\pi$, and thus it the unwrapping process can be assumed to be resolving. This formulation yields phase scalars that are expressed with a single unknown integer (M) constrained in the complex domain, thus converting the vector phase unwrapping process into a scalar phase unwrapping process.

Optionally the unwrapped phases may be determined in the complex domain based on the phase scalars. As an example, a value for M may be determined based on a value that minimizes the value of UM, such that $0 \leq M \leq M_{max}$. For example, Eq. 5 may be rewritten using Eq. 3b and Eq. 3c:

$$U_M = \sum_m \frac{N_k}{2}[AB_m \cdot \left[\cos\left(2\pi f_m\left(\frac{M}{f_{m0}} + t_{d,m0} - t_{d,m}\right)\right) - 1\right] = 0. \quad \text{(Eq. 6a)}$$

Eq. 6a may be considered equivalent to Eq. 4 and Eq. 5. The constant $$\frac{N_k}{2}$$

may be dropped off, but is kept here for completeness. For the condition where $f_m = f_{m0}$, the unwrapped phase expression $$2\pi f_m\left(\frac{M}{f_{m0}} + t_{d,m0} - t_{d,m}\right) = 2\pi M,$$

one term having the frequency $f_{m0}$ is redundant and can be eliminated, yielding:

$$U_M = \quad \text{(Eq. 6b)}$$
$$\sum_{\substack{m-1 \\ m \neq m0}} \frac{N_k}{2}[AB_m \cdot \left[\cos\left(2\pi f_m\left(\frac{M}{f_{m0}} + t_{d,m0} - t_{d,m}\right)\right) - 1\right] = 0.$$

If the integer M at frequency $f_{m0}$ satisfies Eq. 6a or 6b, the unwrapped phase at all other frequency $f_m$ may be expressed as integer numbers of multiples of $2\pi$ in the ideal case or assumed ideal case. In the case where significant noise is present, the unwrapped phase term may be expressed with an integer $(N_{0m})$ and a residual error of the integer $\Delta N_m$, i.e.: $N_m = f_m\left(\dfrac{M}{f_{m0}} + t_{d,m0} - t_{d,m}\right) = (N_{0m} + \Delta N_m).$ Thus, Eq. 6b is now equivalent to:

$$U_M = \sum_{\substack{m-1 \\ m \neq m0}} \dfrac{N_k}{2}[AB_m \cdot [\cos(2\pi \Delta N_m) - 1] = 0, \quad \text{(Eq. 6c)}$$

wherein $2\pi\Delta N_m$ is a small quantity, and thus $\cos(2\pi\Delta N_m) \approx 1 - 0.5 \cdot (2\pi\Delta N_m)^2$. Eq. 6c may then be simplified as:

$$U_M = \sum_{\substack{m-1 \\ m \neq m0}} \dfrac{N_k}{2}[AB_m \cdot [-0.5 \cdot (2\pi\Delta N_m)^2] = 0. \quad \text{(Eq. 6d)}$$

Dropping off all the constant parameters yields:

$$U_M = \sum_{\substack{m-1 \\ m \neq m0}} [AB_m \cdot (\Delta N_m)^2] = 0. \quad \text{(Eq. 6e)}$$

Eq. 6e may be rewritten to be:

$$U_M = \sum_{\substack{m-1 \\ m \neq m0}} \left[\dfrac{AB_m}{AB_{m0}} \cdot (\Delta N_m)^2\right] = 0. \quad \text{(Eq. 6f)}$$

wherein either Eq. 6e or Eq. 6f can use the instantly measured $AB_m$ or previously measured and averaged ratio of $$\dfrac{AB_m}{AB_{m0}}$$

which may be a constant for each sensor element regardless of the signal strength in the ideal case scenario.

The residual integer number $\Delta N_m$ can be expressed as a round operation with the relationship:

$$\Delta N_m = N_m - \text{round}(N_m) = \quad \text{(Eq. 6g)}$$
$$f_m\left(\dfrac{M}{f_{m0}} + t_{d,m0} - t_{d,m}\right) - \text{round}\left[f_m\left(\dfrac{M}{f_{m0}} + t_{d,m0} - t_{d,m}\right)\right].$$

As an example, the total integer number counting from 0 to $M_{max}$ is equal to the wrapped $2\pi$ counts within a designed unwrapping distance at the specific frequency $f_{m0}$, for example at the highest frequency used by the system. The unwrapping procedure may be summarized with the following example: the radio wavelength of the highest radio frequency may be determined. For instance, if $f_{m0}$=180 Mhz the wavelength is 1.6667 m. A value for $M_{max}$ may be determined for the wrapped phase vectors within a determined maximum unwrapping distance. For example, at a designed unwrapping distance of 15 m, $$M_{max} = \dfrac{2 \times 15}{1.666\ldots} = 18.00072,$$

and may be rounded to an integer 18. M may be set equal to 0, 1, 2 . . . ($M_{max}$-1), e.g., 0, 1, 2 . . . 18, within Eq. 4e or 4f to determine which one $M_0$ value minimizes $U_M$. Unwrapped phases for each frequency of modulation light may then be determined based on at least M. This yields all unwrapped phase $\Psi_m$ expressed with $M_0$ together with wrapped phase $\varphi_{d,m}$ as:

$$\Psi_m = 2\pi \cdot \text{round}(N_m) + \varphi_{d,m} = \quad \text{(Eq. 7)}$$
$$2\pi \cdot \text{round}\left[f_m\left(\dfrac{M_0}{f_{m0}} + t_{d,m0} - t_{d,m}\right)\right] + \varphi_{d,m} \text{ for } m = 1, 2, 3 \ldots.$$

It will be appreciated that any other suitable approaches may be used to determine the unwrapped phases of the frequencies of the selected frequency mode.

The controller 202 may be configured to output an unwrapped depth image, or 'radial-distance map' that may be represented as a numeric array with a radial distance value Zj provided for each pixel and associated with coordinates (X, Y)j that specify the pixel position.

Figure 8:
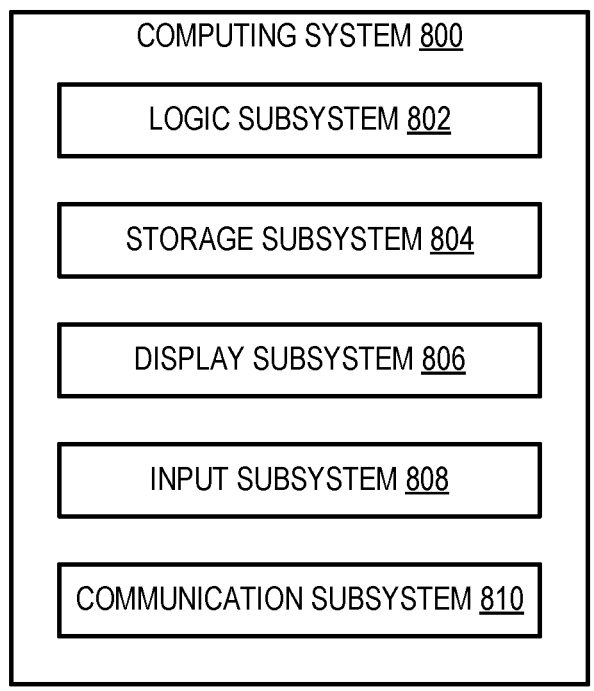
FIG. 8 schematically shows an example computing system.

The controller 202 may be implemented across one or more computing devices, examples of which are discussed herein and with regard to FIG. 8. In some implementations, the controller 202 may be configured to output the signal data and/or depth images to one or more applications 222 that may be configured to perform additional processing.

While this disclosure focuses on periodic modulated light-based amplitude continuous wave applications, such as infrared imaging, the examples disclosed herein may also be applicable to radar and other distance measurement techniques that rely upon phase detection of waveforms at different frequencies in order to determine distance.

Current ToF cameras may lack the ability to provide performance over a wide range of different operating conditions. In particular, ToF cameras may have difficulties in scaling from very close objects to objects much farther away as well as to sense objects of different reflectivities without losing performance (e.g., depth measurement precision) or expending unnecessary power. Fundamental limitations of the detection/readout dynamic range tend to lead either to objects saturating at close distances or objects at long distances being inaccurately ranged to due to low signal-to-noise ratio (SNR). At the same time, the number and choice of modulation frequencies impacts range precision and the ability to range to long distances. More modulation frequencies increase maximum range and robustness, but at the same time increase power consumption. In a similar manner, increased integration times may allow for unwrapping failures with weak signals within the unwrapping range to be recovered and may improve range precision, but may result in an increase in object saturation at distances closer to the camera.

Some previous ToF cameras have used explicit calibration of a small number of fixed modes of operation with known characteristics, using disjointed modulation frequencies and integration times. This provides good performance over a specific limited set of imaging reflectivities, distances and power profiles, but does not provide the ability to optimally handle both very close high reflectivity objects and very far low reflectivity objects in a flexible manner. Further, increasing the number of frequency modes that include disjointed frequencies past a small number may quickly become impracticable due to impracticable calibration times, complexity, and a hardware burden on the ToF camera.

As one example, a ToF camera may be configured according to previous methods to have six different frequency modes each configured for a different imaging distance, as follows: Mode 1 at 4.0 meters [f1, f2], Mode 2 at 15 meters [f3, f4, f5], Mode 3 at 25 meters [f6, f7, f8, f9], Mode 4 at 35 meters [f10, f11, f12, f13, f14], Mode 5 at 45 meters [f15, f16, f17, f18, f19, f20], Mode 6 at 100 meters [f21, f22, f23, f24, f25, f26, f27]. In this example, twenty-seven different frequencies are used to implement the six frequency modes. This means that the ToF camera hardware would have to be able to generate the twenty-seven frequencies. Also, the ToF camera would need to perform twenty-seven calibrations for systematic phase offset calibration, thermal calibration, and also employ twenty-seven sets of calibration memories. Such a ToF camera may take significant time to calibrate and have a relatively high cost.

Thus, to address the above issues, examples are disclosed herein that relate to sharing modulation frequencies between modes, such that modulation frequencies/integration times can be calibrated and reused in different frequency modes. The disclosed examples may allow range, exposure time, and power consumption to be freely and dynamically traded against each other at runtime without additional calibration impact.

Figure 3:
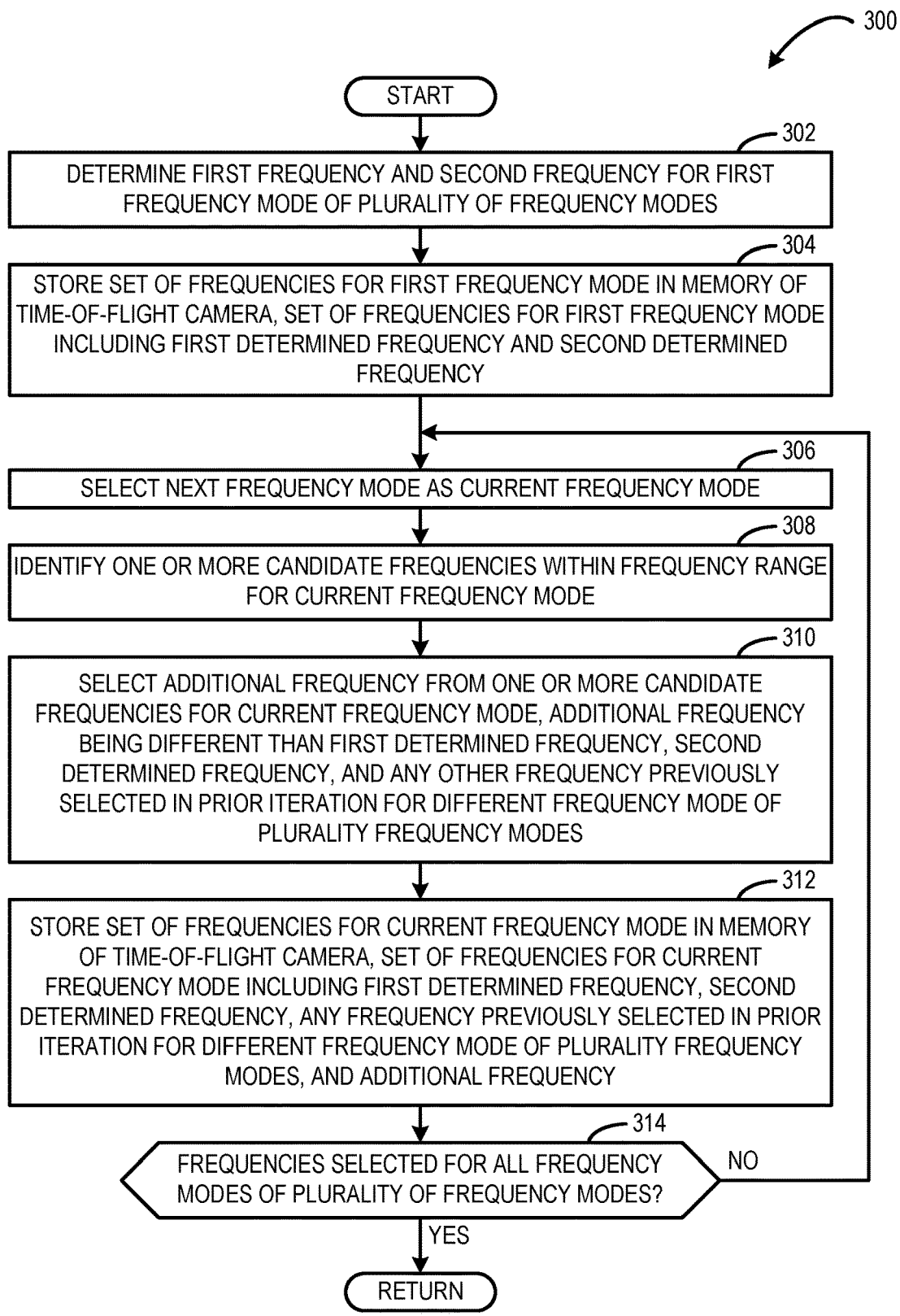
FIG. 3 shows a flow diagram depicting an example method for determining frequencies for frequency modes for a ToF camera.

FIG. 3 shows an example method 300 for determining frequency modes for a ToF camera, such as the ToF camera 200 of FIG. 2. The ToF camera may include any suitable number of different frequency modes. In some examples, the ToF camera may have two or more different frequency modes, while in other examples the ToF camera may have three, four, five, six, seven, or more different frequency modes. In some examples, different frequency modes may be optimized for different conditions, and/or may have different maximum unwrapping distances. Further, different frequency modes may be configured to image objects having different reflectivities. Additionally, different frequency modes may be configured based on different power modes of the ToF camera, such as imaging in a higher power mode and imaging in a lower power mode.

At 302, a first frequency and a second frequency are selected for a first frequency mode of a plurality of frequency modes of the ToF camera. The first and second frequencies may be selected in any suitable manner. For example, the first and second frequencies may be arbitrary, predetermined, or based on operating conditions.

In some examples, the first and second frequencies may be selected based upon a desired operating characteristic of the first frequency mode. As one example, the first and second frequencies may be selected based on a desired depth resolution, and/or a desired maximum unwrapping range, as well robustness. As a more specific example, the first and second frequencies may be selected for imaging a relatively faster event and shorter distances. A maximum unwrapping range for a frequency mode may be empirically determined, estimated, predetermined, or arbitrary, and/or may be based on a specific (e.g., highest) frequency of the frequency mode.

Frequencies for each of the frequency modes of the ToF camera also may be selected based on other factors than a maximum unwrapping distance. As one example, a ToF camera incorporated into a battery-powered device may generally have modes with lower maximum unwrapping ranges and lower frequencies. Lower frequencies may be utilized to conserve battery power of the mobile device, among other factors. Likewise, a ToF camera incorporated into a plug-in device may utilize higher frequencies, as power saving may be less of a consideration than for a battery device, and higher frequencies may provide higher accuracy depth measurements at longer unwrapping distances than lower frequencies.

At 304, a first set of frequencies for the first frequency mode is stored in memory of the ToF camera. The memory in which the first set of frequencies is stored may take any suitable form. Examples are discussed in further detail below with reference to FIG. 8.

At 306, a next frequency mode of the plurality of frequency modes is selected as a current frequency mode, and at 308, one or more candidate frequencies are identified within a frequency range for the current frequency mode.

The plurality of candidate frequencies may be identified according to any suitable approach. In one example, one or more candidate frequencies are identified by sweeping through the frequency range at a designated step resolution to identify frequencies having an unwrapping passing rate greater than a threshold percentage, which also is referred to as an unwrapping passing rate. In such an approach, each candidate frequency may include common integer denominators, and/or fractional denominators. The unwrapping passing rate is defined by the equation:

$$\left[1 - \frac{\text{Unwrapping failure counts at full unwrapping distance}}{\text{Total unwrapping counts at full designed unwrapping distance}}\right]\%$$

Figure 4:
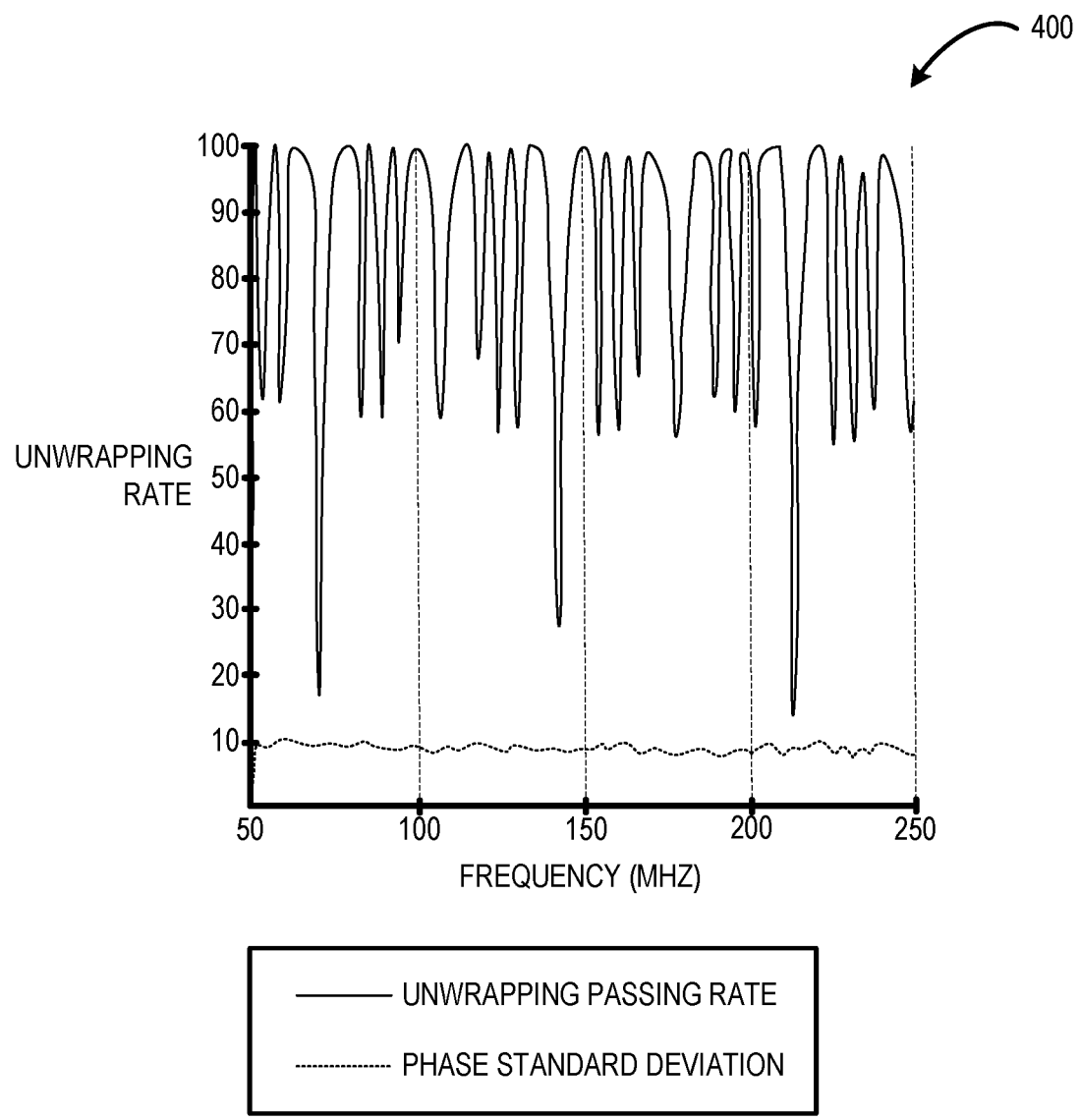
FIG. 4 shows an example plot of an unwrapping passing rate as a function of frequency that may be used to select a frequency for a frequency mode of a ToF camera.

FIG. 4 shows an example plot 400 illustrating an unwrapping passing rate across a frequency range. Such a plot may be used to identify candidate frequencies for a frequency mode of a ToF camera. In this example, a frequency range of 50-250 megahertz (MHz) is swept with a 1 MHz step resolution to identify frequencies that have an unwrapping passing rate greater than or equal to a selected passing rate (e.g., 95%, or other suitable value). As can be seen in the plot, a phase standard deviation (noise level) is approximately the same (e.g., ~9.4 degrees) for the entire frequency range. On the other hand, the unwrapping passing rate changes across the frequency range. In particular, the unwrapping passing rate of different frequencies within the frequency range varies between 15% and 99.79%. Frequencies within the frequency range having an unwrapping passing rate that is greater than or equal to the passing rate may be identified as candidate frequencies.

Returning to FIG. 3, at 310 an additional frequency is selected from the plurality of candidate frequencies for the current frequency mode, wherein the additional frequency is different than the first determined frequency, the second determined frequency, and any other frequency previously selected in a prior iteration for a different frequency mode of the plurality frequency modes. In some examples, the additional frequency may be selected based on the type of operating conditions for which the current frequency mode is configured. For example, such operating conditions may include different reflectivities, distances, power profiles, and/or uses/applications of the ToF camera.

At 312, a set of frequencies for the current frequency mode is stored in memory of the ToF camera. The set of frequencies for the current frequency mode may include the first determined frequency, the second determined frequency, any frequency previously selected in a prior iteration for a different frequency mode of the plurality frequency modes, and the additional frequency. At 314, it is determined whether or not frequencies are selected for all frequency modes of the plurality of frequency modes. If frequencies have been selected for all frequency modes of the plurality of frequency modes, then the method ends. Otherwise, if frequencies have not been selected for all of the frequency modes of the plurality of frequency modes, then a next frequency mode is selected, and frequencies are selected for the next mode in the manner described above.

In some examples, a total number of frequencies included in all of the plurality of frequency modes obeys the combinatorial equation:

$$C(m, r) = \frac{m!}{r!(m-r)!},$$

where m is the total number of frequencies and where r is a total number of frequencies per mode of the plurality of frequency modes. This equation implies that frequency multiplexing may be used such that all frequencies already used in other frequency modes can be reused in an additional mode. In other words, an additional frequency mode can be generated by adding only one additional frequency to the overall total number of frequencies such that many additional frequency modes may be generated by adding one additional frequency. In some examples, a new frequency mode can be defined by selecting unique combinations of any of the total number of calibrated frequencies. In some such examples, two different frequency modes may have different combination of the same number of frequencies. Table 1 shows example frequency multiplexing modes for six different frequency modes of a ToF camera that may be selected using the above described method.

TABLE 1

| | Frequencies [MHz] | | | | | | | Unwrapping |
|---|---|---|---|---|---|---|---|---|
| | 142 | 177.5 | 186 | 129 | 202 | 111 | 61 | Distance |
| 2f-mode | X | X | NA | NA | NA | NA | NA | 4.22 m |
| 3f-mode | X | X | X | NA | NA | NA | NA | 16.6 m |
| 4f-mode | X | X | X | X | NA | NA | NA | 25 m |
| 5f-mode | X | X | X | X | X | NA | NA | 35 m |
| 6f-mode | X | X | X | X | X | X | NA | 45 m |
| 7f-mode | X | X | X | X | X | X | X | 100 m |

In this example, each additional frequency mode beyond the first frequency mode (that includes frequencies 142 MHz and 177.5 MHz) adds only one additional frequency and reuses the other frequencies from the other modes. For example, the 4f frequency mode uses all of the frequencies of 3f frequency mode and one additional frequency. Additionally, in this example, each frequency mode is configured for a different maximum unwrapping distance.

Note that Table 1 provides one example of sets of frequencies selected for different frequency modes. In other examples, different frequency modes may have any suitable number of frequencies with any suitable values.

Figure 5:
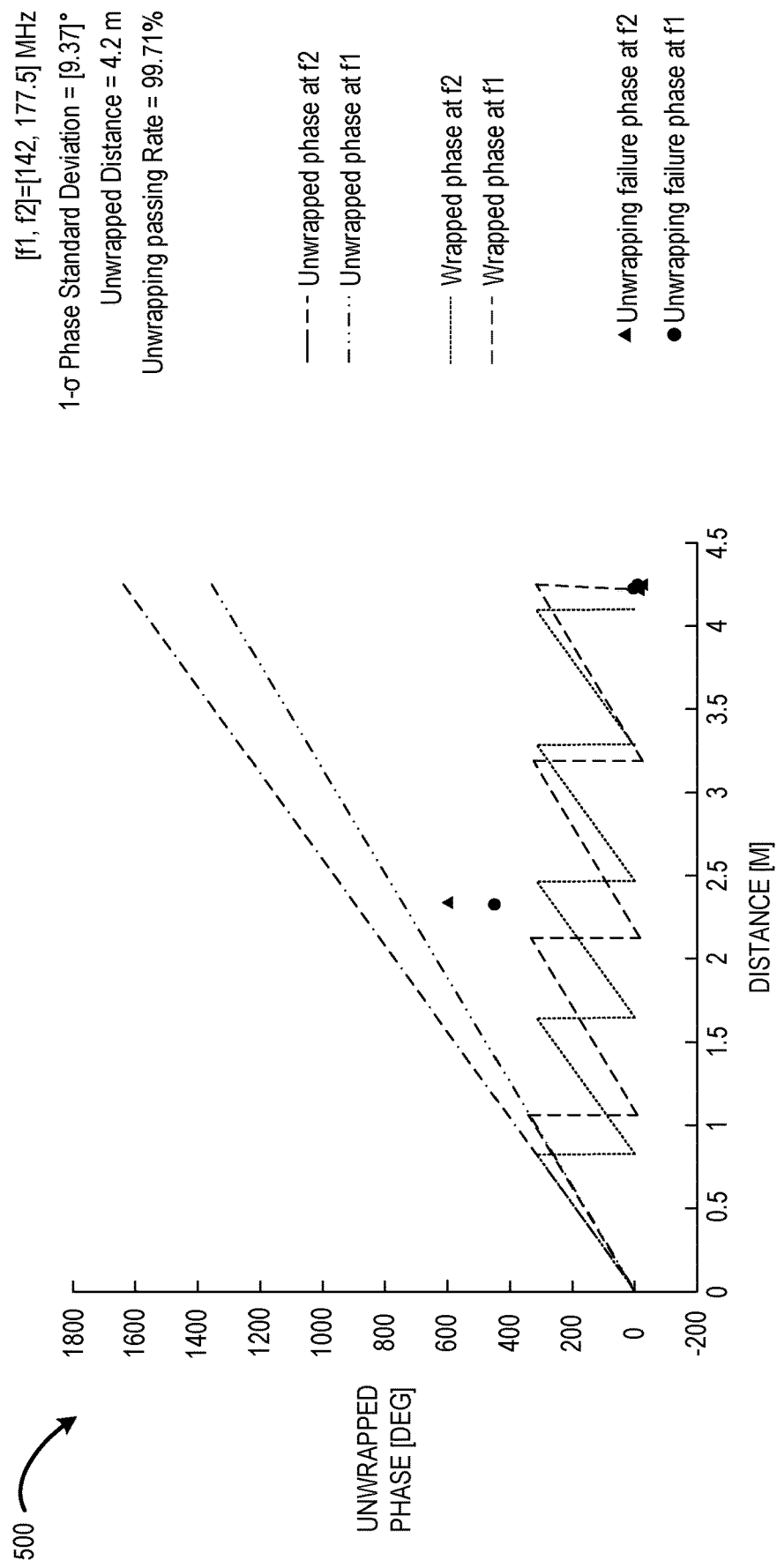
FIG. 5 shows an example plot of unwrapped phase versus distance up to a distance of 4.2 meters for a noise condition.
Figure 6:
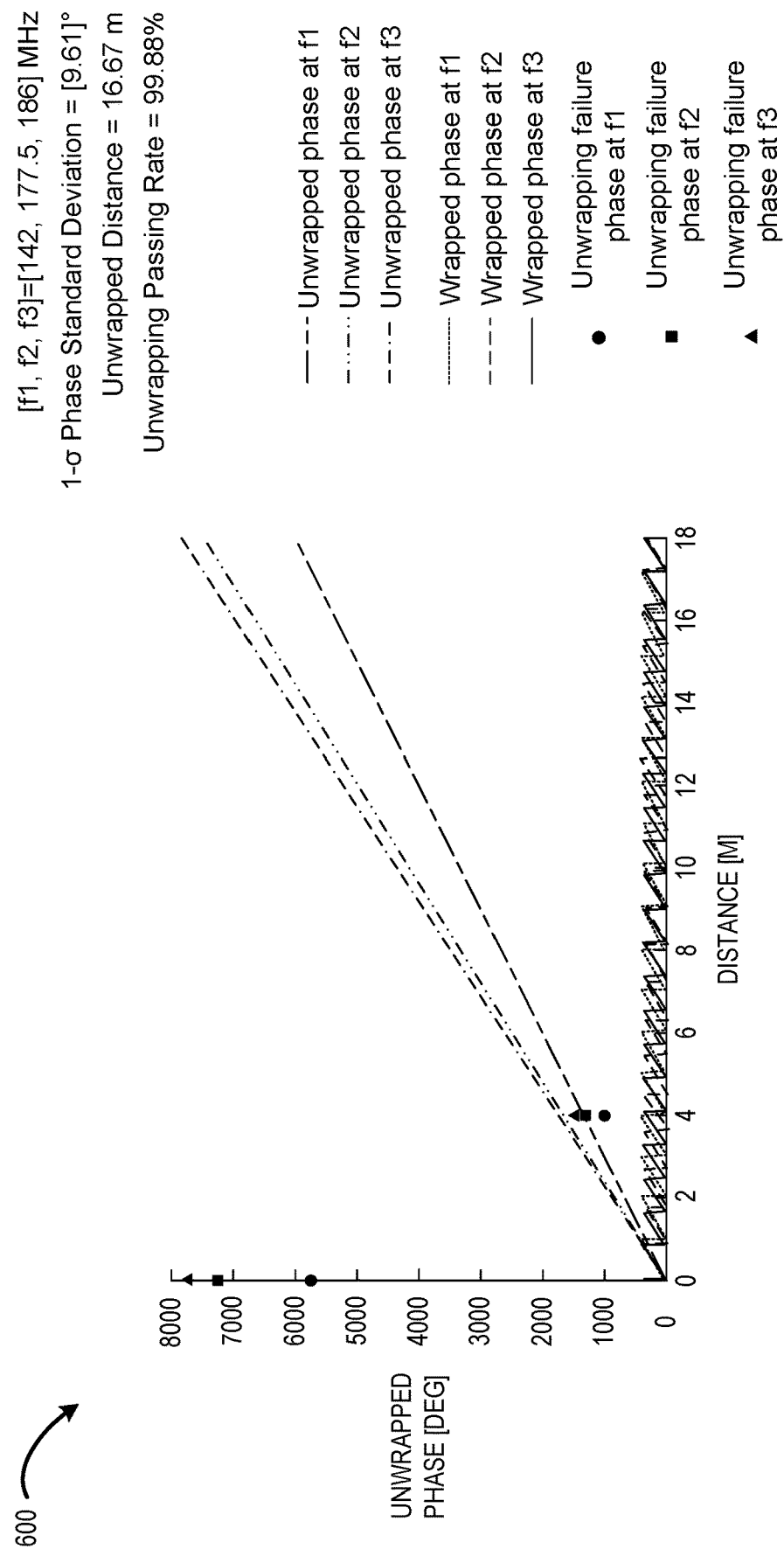
FIG. 6 shows an example plot of unwrapped phase versus distance up to a distance of 16.67 meters for a noise condition.

FIGS. 5 and 6 show example plots that demonstrate simulated unwrapping results for 2-frequency and 3-frequency modes of operation of an example ToF camera. FIG. 5 shows an example plot 500 for a mode having two frequencies of f1=142 MHz and f2=177.5 MHz, and a maximum unwrapping distance of 4.2 meters. The unwrapping passing rate/probability is about 99.71% at a standard deviation phase noise of approximately 9.37 degrees. The outlying points on the plot 500 represent unwrapping errors for the two unwrapped phases. FIG. 6 shows an example plot 600 for a mode having three frequencies of f1=142 MHz, f2=177.5 MHz, and f3=186 MHz, and a maximum unwrapping distance of 16.67 meters. The unwrapping passing rate/probability is about 99.88% at a standard deviation phase noise of approximately 9.61 degrees. The outlying points on the plot 600 represent unwrapping errors for the three unwrapped phases. Sets of frequencies for the other frequency modes of the plurality of frequency modes (e.g., 3f-7f frequency modes) may be unwrapped with similar unwrapping passing rates.

By following the example method of FIG. 3, modulation frequencies may be pre-selected in a system design phase for different frequency modes in an efficient manner that may help reduce the calibration time of the ToF camera. For example, the above described method to select modulation frequencies within a 50-250 MHz frequency range (as shown in FIG. 4) results in a sweep of 200 MHz with 1 MHz step resolution for each frequency mode after the first frequency mode (e.g., 2f). The number of steps for sweeping only one frequency for each additional mode (from modes 3f-7f) is $201^1+201^1+201^1+201^1+201^1=1005$ total steps. In contrast, the use of previous approaches with no common frequencies to calibrate six different frequency modes with the same total number as modes 2f-7f above would utilize the following number of total frequency steps: sum(201^r), for r=3, 4 . . . 7 or $201^3+201^4+201^5+201^6+201^7 \cong 1.33\times10^{16}$ total steps. By using the herein described method to select modulation frequencies, the search space for the frequencies to be selected and used during calibration may be reduced relative to other previous approaches. Moreover, by sharing common frequencies between different frequency modes, a total number of frequencies used across the plurality of frequency modes may be reduced, and a burden on calibration memory, calibration processing operations, and hardware to generate the modulation frequencies of a ToF camera may be reduced.

Using this multiplexing approach, in some implementations, different modes may be efficiently configured for different uses/applications. As one example, the low r frequency number modes (e.g., r=2, 3) may be configured for imaging short distances, shiny objects, and/or fast dynamic measurements, and higher r frequency number modes (e.g., up to r=m) may be configured for longer distances, lower reflectance objects, and/or static events.

Figure 7:
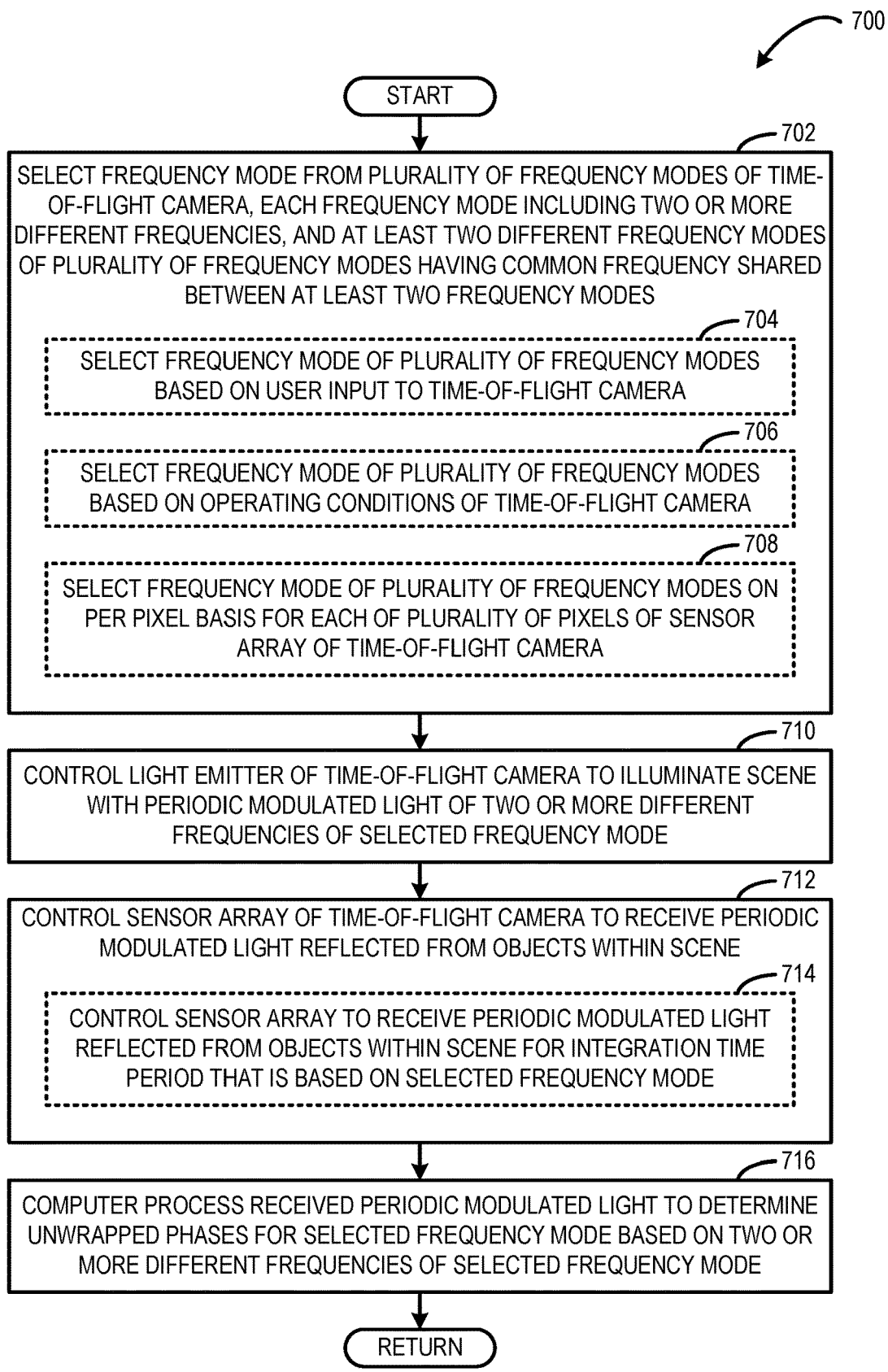
FIG. 7 shows an example method for controlling a ToF camera to perform phase unwrapping.

FIG. 7 shows an example method 700 for controlling a ToF camera. The method 700 may be performed by the ToF camera 200 shown in FIG. 2 in one example. The ToF camera includes a plurality of frequency modes where each frequency mode includes two or more different frequencies, and at least two different frequency modes of the plurality of frequency modes have a common frequency shared between the at least two frequency modes.

At 702, a frequency mode is selected from the plurality of frequency modes of the ToF camera. In some implementations, as indicated at 704, the frequency mode optionally may be selected based on user input to the ToF camera. In some examples, the user input may indicate an explicit selection of the particular frequency mode. In other examples, the frequency mode may be selected based on other user selected factors than a direct mode selection. As one example, different frequency modes may be associated with different software applications (e.g., self-portrait application, video application, video conference application) and the frequency mode may be selected based on user input that executes a software application to which the frequency mode is associated. As another example, different frequency modes may be associated with different settings of the ToF camera (e.g., video mode, time-lapse mode, zoom mode) and the frequency mode may be selected based on user input that selects a setting with which the frequency mode is associated.

In other implementations, as indicated at 706, the frequency mode optionally may be selected based on operating conditions of the ToF camera. Such operating conditions may include, for example, characteristics of an object of interest being imaged by the ToF camera. Such characteristics may include a distance, reflectivity, ambient light condition, and/or motion of the object of interest. As another example, such operating conditions may include an ambient lighting of the scene. The frequency mode may be selected based on any other suitable operating condition of the ToF camera. In some examples, such operating conditions may be determined based on signals from one or more sensors of the ToF camera. Further, in some examples, such operating conditions may be determined using machine vision and/or machine learning technology to identify objects of interest in the imaged scene.

Additionally, in some implementations, as indicated at 708, the frequency mode optionally may be selected on a per pixel basis for each of a plurality of pixels of a sensor array of the ToF camera. Different frequency modes may be selected for different pixels based on characteristics of objects imaged by the pixel intensities. For example, a first pixel may image an object that is located closer to the ToF camera using a lower subset of the r-frequency mode that is configured for processing a shorter maximum unwrapping distance. A second pixel may image a different object that is located farther from the ToF camera using a higher r-frequency mode that is configured for processing a longer maximum unwrapping distance.

At 710, a light emitter of the ToF camera is controlled to illuminate a scene with periodic modulated light of the two or more different frequencies of the frequency mode selected. In some implementations, the light emitter optionally may be controlled to emit the periodic modulated light at different power levels for different frequencies of the frequency mode selected. In some implementations, the power levels may be varied across different frequency modes.

At 712, the sensor array of the ToF camera is controlled to receive the periodic modulated light reflected from objects within the scene. In some implementations, as indicated at 714, the sensor array optionally may be controlled to receive the periodic modulated light reflected from objects within the scene for an integration time period that is associated with the frequency mode. In such implementations, different frequency modes of the plurality of frequency modes may have different integration time periods. In some examples, frequency modes that have a greater number of frequencies (e.g., higher r-frequencies) may have a longer integration time period than frequency modes having a lesser number of frequencies (e.g., lower r-frequencies). Further, in some examples, the integration times may be heterogenous with the different frequency modes. For example, a first frequency may have a much shorter integration time than the seventh frequency, with the frequencies progressively increasing in integration time between the first and seventh frequencies.

Additionally, in some examples, the frequencies may be chosen so that the frequency modes with more frequencies are substantially overdetermined from an unwrapping perspective. When only the first few modulation frequencies are used, the integration times may be much shorter so that the ToF camera does not saturate at close range. When more modulation frequencies are used, the ToF camera may be able to measure distance much further away because the integration times are longer. If objects come very close to the ToF camera such that the longer integrations saturate the sensor array, the frequency mode may be switched to a different frequency mode having shorter integration times in order to accurately range the objects. For example, such mode switching may be performed using signal processing or an advanced hardware configuration.

In some implementations, an integration time is associated with each modulation frequency, which can either be constant or vary between modulation frequencies. The frequency modes are configured such that the 3-frequency mode is created from the 2-frequency mode by adding an additional frequency measurement without changing the existing frequencies and their integration times. Similarly, the n-frequency mode can be created from the (n−1)-frequency mode. In other words the n-frequency mode can be considered to be a proper-superset of the (n−1)-frequency mode. In one specific case, the integration times are monotonically increasing with the frequency number. During operation, the hardware operates in the n-frequency mode, but on an individual pixel basis frequency measurement values may be discarded based upon a quality criterion, such as saturation, such that the measurements for that pixel are processed as if the hardware were operating in the m-frequency mode, where m<=n. In the implementation where the integration times are monotonically increasing, switching to a mode with a smaller number of frequencies results in the maximum integration time of any of the utilized frequencies decreasing. This means that objects which are closer to the camera are less likely to saturate, thus providing a mechanism for adjusting dynamic range after collection of the data, potentially at the expense of range precision or wrapping distance, which may change as a result of the effective frequency mode used for processing that particular image pixel.

In a variant of the above, arbitrary subsets of the frequency measurement values may be chosen and processed to produce range, not merely regression from a fixed n-frequency mode to a fixed m-frequency mode where m<=n. In such examples, high quality (e.g., unsaturated, high SNR) measurements may be selected, enabling measurements with a fixed sequence of modulation frequencies and integration times at the system level, but adapting on a per-pixel basis to only use the highest quality subset of the measurements to maximize dynamic range or another property. As a more specific example, in one implementation only the shortest integration times may be used for close objects and only the longest integration times for objects a long way away. In other examples, a weighting scheme may be used to weight shorter integration times less than unsaturated long integration times so as to improve the noise properties of the estimated range. The quality criterion used for selecting frequency measurement value subsets may also include other factors such as motion blur and others not described here or known to those skilled in the art.

In some variants of the above, other processing methods used for calculating range may involve least squares or other inversion methods, including but not limited to optimization based approaches, direct inversion, machine learning or deep neural networks. Rather than explicitly switching on a per-pixel basis from an n-frequency mode for processing to an m-frequency mode for processing, where m<=n, the processing method may instead assign a weight, where a low or zero weight is applied to data that is saturated or inconsistent with other data, in some implementations this includes the spatial neighborhood or the other frequencies measurements themselves. In other cases, a neural network, other machine learning algorithm or other algorithm may implicitly discard data due to saturation, motion, SNR, inconsistency or any other factors so as to calculate range in a manner which is robust to error. Inconsistencies may be of any type, including estimated unwrapped range differences between measurements made by different frequencies.

In some variants of the above, other frequency selection methods known to those expert in the art may be used, such as brute force searches, greedy depth-first searches, pre-calculated tables or random number generators.

In some implementations, the frequencies may be chosen in such a manner that the unwrapping is overdetermined and choosing the n-frequency mode over the (n−1)-frequency mode does not impact the unwrapping distance. In other cases, changing the frequency mode may impact the unwrapping distance.

Note that references to 1st and $2^{nd}$ frequencies and other identifiers does not necessarily denote the actual ordering of the frequencies during operation and is merely described in this manner for clarity. In some implementations the frequencies can be in any order in operation, and in some implementations the order may change from frame to frame.

In some implementations, the frequency mode may change spatially across the FOV at the hardware level rather than controlled in post-processing, either dynamically controlled or in a static pattern. An example of this is when the entire system runs in a 6-frequency mode, but for the final frequency only part of the sensor is integrating or modulated. This means that part of the scene is imaged in a 5-frequency mode and the remainder in a 6-frequency mode. In this scenario, the processing takes this knowledge into account.

In another implementation, the shape of the illumination emitted onto the scene is changed for each frequency using a spatial light modulator such as a micromirror array or other illumination field control device, such as a liquid lens or any other device known to those skilled in the art. This means that each pixel has measurements of some improper subset of the frequencies. Depth is calculated for each pixel in a manner consistent with the available frequency information. In one implementation the first and second frequencies illuminate the entire scene, and subsequent frequencies use progressively smaller and smaller fields of illumination controlled by changing the focus of a liquid lens. This results in the outer regions of the image having data collected in a 2-frequency mode and progressively higher frequency modes towards the center of the image. Depending on the frequency selection, this can enable measurement to a larger distance in the center of the image with shorter maximum distances at the edges.

At 716, the periodic modulated light received is computer processed to determine unwrapped phases for the frequency mode selected based on the two or more different frequencies of the frequency mode selected. The unwrapped phased may be determined in any suitable manner.

According to the above described method, a single ToF camera may be used for many different uses/applications while providing high accuracy phase unwrapping for distance measurements.

The examples described herein may allow for one or more modulation frequencies to be shared between different frequency modes of operation of a ToF camera, such that a single set of modulation frequencies/integration times can be calibrated once for a particular frequency mode, and reused for other frequency modes. By sharing modulation frequencies between different frequency modes, a total number of modulation frequencies used for all of the frequency modes may be reduced relative to an approach that does not share frequencies between different frequency modes. Such an approach allows for factory calibration operations such as systematic phase offsets and thermal calibrations to be reduced in contrast to the factory calibration for a ToF 3D camera using disconnected multiple frequency modes with numerous frequencies. Additionally, such an approach may help reduce a device application burden on calibration memory, calibration processing operations, and hardware to generate the modulation frequencies. This in turn may allow for the production time and cost of a ToF camera to be reduced. Moreover, such an approach may allow for ToF camera variables such as maximum range, exposure time and power consumption to be freely and dynamically traded against each other at runtime to handle different operating conditions without additional calibration impact.

In some implementations, the methods and processes described herein may be tied to a computing system of one or more computing devices. In particular, such methods and processes may be implemented as a computer-application program or service, an application-programming interface (API), a library, and/or other computer-program product.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

FIG. 8 schematically shows a simplified representation of a computing system 800 configured to provide any to all of the compute functionality described herein. Computing system 800 may take the form of one or more cameras, such as a CW ToF camera, personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. As examples, the computing system 800 may take the form of the cameras 102A, 102B, 102C, 102D shown in FIG. 1 and the camera 200 shown in FIG. 2.

Computing system 800 includes a logic subsystem 802 and a storage subsystem 804. Computing system 800 may optionally include a display subsystem 806, input subsystem 808, communication subsystem 810, and/or other subsystems not shown in FIG. 8.

Logic subsystem 802 includes one or more physical devices configured to execute instructions. For example, the logic subsystem 802 may be configured to execute instructions that are part of one or more applications, services, or other logical constructs. The logic subsystem 802 may include one or more hardware processors configured to execute software instructions. Additionally or alternatively, the logic subsystem 802 may include one or more hardware or firmware devices configured to execute hardware or firmware instructions. Processors of the logic subsystem 802 may be single-core or multi-core, and the instructions executed thereon may be configured for sequential, parallel, and/or distributed processing. Individual components of the logic subsystem 802 optionally may be distributed among two or more separate devices, which may be remotely located and/or configured for coordinated processing. Aspects of the logic subsystem 802 may be virtualized and executed by remotely accessible, networked computing devices configured in a cloud-computing configuration.

Storage subsystem 804 includes one or more physical devices configured to temporarily and/or permanently hold computer information such as data and instructions executable by the logic subsystem 802. When the storage subsystem 804 includes two or more devices, the devices may be collocated and/or remotely located. Storage subsystem 804 may include volatile, nonvolatile, dynamic, static, read/write, read-only, random-access, sequential-access, location-addressable, file-addressable, and/or content-addressable devices. Storage subsystem 804 may include removable and/or built-in devices. When the logic subsystem 802 executes instructions, the state of storage subsystem 804 may be transformed—e.g., to hold different data.

Aspects of logic subsystem 802 and storage subsystem 804 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example. For example, the logic subsystem and the storage subsystem may be included in the controller 116 shown in FIGS. 1 and 2.

The logic subsystem 802 and the storage subsystem 804 may cooperate to instantiate one or more logic machines. The controller 202, the RF oscillator 204, and the phase shifter 220 shown in FIG. 2 are examples of such logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 806 may be used to present a visual representation of data held by storage subsystem 804. This visual representation may take the form of a graphical user interface (GUI). Display subsystem 806 may include one or more display devices utilizing virtually any type of technology. In some implementations, display subsystem 806 may include one or more virtual-, augmented-, or mixed reality displays.

When included, input subsystem 808 may comprise or interface with one or more input devices. An input device may include a sensor device or a user input device. Examples of user input devices include a keyboard, mouse, touch screen, or game controller. In some implementations, the input subsystem 808 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 810 may be configured to communicatively couple computing system 800 with one or more other computing devices. Communication subsystem 810 may include wired and/or wireless communication devices compatible with one or more different communication protocols. The communication subsystem 810 may be configured for communication via personal-, local- and/or wide-area networks.

In an example, a time-of-flight camera, comprises a light emitter, a sensor array, and a controller configured to select a frequency mode from a plurality of frequency modes, each frequency mode including two or more different frequencies, and at least two different frequency modes of the plurality of frequency modes having a common frequency shared between the at least two frequency modes, control the light emitter to illuminate a scene with periodic modulated light of the two or more different frequencies of the frequency mode selected, control the sensor array to receive the periodic modulated light reflected from objects within the scene, and process the periodic modulated light received by the sensor array to determine unwrapped phases for the frequency mode selected based on the two or more different frequencies of the frequency mode selected. In this example and/or other examples, each frequency mode of the plurality of frequency modes optionally may include a different number of frequencies. In this example and/or other examples, each frequency mode of the plurality of frequency modes optionally may include the common frequency shared between the plurality of frequency modes. In this example and/or other examples, a total number of frequencies included in all of the plurality of frequency modes optionally may obey a combinatorial equation:

$$C(m, r) = \frac{m!}{r!(m-r)!},$$

where m is the total number of frequencies and where r is a total number of frequencies per mode of the plurality of frequency modes. In this example and/or other examples, one or more of the frequencies included in one or more of the plurality of frequency modes optionally may be non-harmonic. In this example and/or other examples, the controller optionally may be configured to control the light emitter to emit the periodic modulated light at different power levels or different integration times for different frequencies of the frequency mode selected. In this example and/or other examples, the sensor array optionally may be configured to receive the periodic modulated light reflected from objects within the scene for an integration time period that is associated with the frequency mode, and different frequency modes of the plurality of frequency modes optionally may have different integration time periods or different power levels. In this example and/or other examples, frequency modes that have a greater number of frequencies also optionally may have a longer integration time period than frequency modes having a lesser number of frequencies. In this example and/or other examples, each frequency mode of the plurality of frequency modes optionally may include different frequencies that are selected for inclusion in the frequency mode based on one or more of a distance of an object in the scene, a reflectivity of the object, and a motion of the object. In this example and/or other examples, the controller optionally may be configured to select the frequency mode based on operating conditions of the time-of-flight camera. In this example and/or other examples, the sensor array optionally may include a plurality of pixels, and the controller optionally may be configured to select the frequency mode of the plurality of frequency modes on a per pixel basis for each of the plurality of pixels. In this example and/or other examples, the frequency mode optionally may be selected on a per-pixel basis based upon one or more of the signal-to-noise ratio, signal level, saturation, consistency between measurements and knowledge of the shape of the field-of-illumination. In this example and/or other examples, at least one first frequency within the frequency mode optionally may have one or more of a different integration time, a different optical power or a different field-of-illumination from a second frequency within the frequency mode.

In another example, a method for controlling a time-of-flight camera comprises selecting a frequency mode from a plurality of frequency modes of the time-of-flight camera, each frequency mode including two or more different frequencies, and at least two different frequency modes of the plurality of frequency modes having a common frequency shared between the at least two frequency modes, controlling a light emitter of the time-of-flight camera to illuminate a scene with periodic modulated light of the two or more different frequencies of the frequency mode selected, controlling a sensor array of the time-of-flight camera to receive the periodic modulated light reflected from objects within the scene, and computer processing the periodic modulated light received by the sensor array to determine unwrapped phases for the frequency mode selected based on the two or more different frequencies of the frequency mode selected. In this example and/or other examples, the frequency mode optionally may be selected based on operating conditions of the time-of-flight camera. In this example and/or other examples, the sensor array optionally may include a plurality of pixels, and the method optionally may further comprise selecting the frequency mode of the plurality of frequency modes on a per pixel basis for each of the plurality of pixels.

In yet another example, a method of determining frequency modes for a time-of-flight camera comprises for each of a plurality of frequency modes of the time-of-flight camera other than a first frequency mode including a first determined frequency and a second determined frequency, iteratively identifying one or more candidate frequencies within a frequency range, selecting an additional frequency from the one or more candidate frequencies for the current frequency mode, the additional frequency being different than the first determined frequency, the second determined frequency, and any other frequency previously selected in a prior iteration for a different frequency mode of the plurality frequency modes, and storing a set of frequencies for the current frequency mode in memory of the time-of-flight camera, the set of frequencies for the current frequency mode including the first determined frequency, the second determined frequency, any frequency previously selected in a prior iteration for a different frequency mode of the plurality frequency modes, and the additional frequency. In this example and/or other examples, the one or more candidate frequencies optionally may be each identified based on an unwrapping probability for the candidate frequency being greater than a threshold probability. In this example and/or other examples, each frequency mode optionally may have a different unwrapping distance and robustness. In this example and/or other examples, the plurality of frequency modes optionally may include more than two frequency modes.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A time-of-flight camera, comprising:
  a light emitter;
  a sensor array; and
  a controller configured to
    select a frequency mode from a plurality of frequency modes dynamically during runtime based on at least an operating condition of the time-of-flight camera, at least two frequency modes of the plurality of frequency modes configured for different imaging distance ranges and including two or more different frequencies, the at least two frequency modes including a different number of frequencies, wherein a number of frequencies included in a frequency mode of the at least two frequency modes is based on an imaging distance range for which the frequency mode is configured, and the at least two frequency modes having a common frequency shared between the at least two frequency modes;
    control the light emitter to illuminate a scene with periodic modulated light of the two or more different frequencies of the frequency mode selected,
    control the sensor array to receive the periodic modulated light reflected from objects within the scene, and
    process the periodic modulated light received by the sensor array to determine unwrapped phases for the frequency mode selected based on the two or more different frequencies of the frequency mode selected.

2. The time-of-flight camera of claim 1, wherein each frequency mode of the plurality of frequency modes includes the different number of frequencies.

3. The time-of-flight camera of claim 1, wherein each frequency mode of the plurality of frequency modes includes the common frequency shared between the plurality of frequency modes.

4. The time-of-flight camera of claim 1, wherein a total number of frequencies included in all of the plurality of frequency modes obeys a combinatorial equation:

$$C(m, r) = \frac{m!}{r!(m-r)!},$$

where m is the total number of frequencies and where r is a total number of frequencies per mode of the plurality of frequency modes.

5. The time-of-flight camera of claim 1, wherein one or more of the frequencies included in one or more of the plurality of frequency modes is non-harmonic.

6. The time-of-flight camera of claim 1, wherein the controller is configured to control the light emitter to emit the periodic modulated light at different power levels or integration times for different frequencies of the frequency mode selected.

7. The time-of-flight camera of claim 1, wherein the sensor array is configured to receive the periodic modulated light reflected from objects within the scene for an integration time period that is associated with the frequency mode, and wherein different frequency modes of the plurality of frequency modes have different integration time periods or power levels.

8. The time-of-flight camera of claim 7, wherein frequency modes that have a greater number of frequencies also have a longer integration time period than frequency modes having a lesser number of frequencies.

9. The time-of-flight camera of claim 1, wherein each frequency mode of the plurality of frequency modes includes different frequencies that are selected for inclusion in the frequency mode based on one or more of a distance of an object in the scene, a reflectivity of the object, and a motion of the object.

10. The time-of-flight camera of claim 1, wherein the controller is configured to select the frequency mode based on operating conditions of the time-of-flight camera.

11. The time-of-flight camera of claim 1, wherein the sensor array includes a plurality of pixels, and wherein the controller is configured to select the frequency mode from the plurality of frequency modes on a per pixel basis for each of the plurality of pixels.

12. The time-of-flight camera of claim 11, wherein the frequency mode is selected on a per-pixel basis based upon one or more of the signal-to-noise ratio, signal level, saturation, consistency between measurements and knowledge of the shape of the field-of-illumination.

13. The time-of-flight camera of claim 12, wherein at least one first frequency within the frequency mode has one or more of a different integration time, a different optical power or a different field-of-illumination from a second frequency within the frequency mode.

14. A method for controlling a time-of-flight camera, the method comprising:
  selecting a frequency mode from a plurality of frequency modes of the time-of-flight camera dynamically during runtime based on at least an operating condition of the time-of-flight camera, at least two frequency modes of the plurality of frequency modes configured for different imaging distance ranges and including two or more different frequencies, the at least two frequency modes including a different number of frequencies, wherein a number of frequencies included in a frequency mode of the at least two frequency modes is based on an imaging distance range for which the frequency mode is configured, and the at least two frequency modes having a common frequency shared between the at least two frequency modes;
  controlling a light emitter of the time-of-flight camera to illuminate a scene with periodic modulated light of the two or more different frequencies of the frequency mode selected,
  controlling a sensor array of the time-of-flight camera to receive the periodic modulated light reflected from objects within the scene, and
  computer processing the periodic modulated light received by the sensor array to determine unwrapped phases for the frequency mode selected based on the two or more different frequencies of the frequency mode selected.

15. The method of claim 14, wherein the frequency mode is selected based on operating conditions of the time-of-flight camera.

16. The method of claim 14, wherein the sensor array includes a plurality of pixels, and wherein the method further comprises selecting the frequency mode of the plurality of frequency modes on a per pixel basis for each of the plurality of pixels.

17. A method of determining frequency modes for a time-of-flight camera, the method comprising:

for each of a plurality of frequency modes configured for different imaging distance ranges of the time-of-flight camera other than a first frequency mode including a first determined frequency and a second determined frequency, iteratively identifying one or more candidate frequencies within a frequency range;

selecting an additional frequency from the one or more candidate frequencies for the current frequency mode, the additional frequency being different than the first determined frequency, the second determined frequency, and any other frequency previously selected in a prior iteration for a different frequency mode of the plurality frequency modes, and storing a set of frequencies for the current frequency mode in memory of the time-of-flight camera, the set of frequencies for the current frequency mode including the first determined frequency, the second determined frequency, any frequency previously selected in a prior iteration for a different frequency mode of the plurality frequency modes, and the additional frequency, the set of frequencies for the current frequency mode having a different number of frequencies than at least one other frequency mode of the plurality of frequency modes, and wherein a number of frequencies included in the set of frequencies for the current frequency mode is based on an imaging distance range for which the current frequency mode is configured.

18. The method of claim 17, wherein the one or more candidate frequencies are each identified based on an unwrapping probability for the candidate frequency being greater than a threshold probability.

19. The method of claim 17, wherein each frequency mode has a different unwrapping distance and robustness.

20. The method of claim 17, wherein the plurality of frequency modes includes more than two frequency modes.

* * * * *